US010852557B2

(12) United States Patent
Yan

(10) Patent No.: US 10,852,557 B2
(45) Date of Patent: Dec. 1, 2020

(54) ADJUSTMENT MECHANISM AND VIEWING APPARATUS USING THE SAME

(71) Applicant: SZ DJI TECHNOLOGY CO., LTD., Shenzhen (CN)

(72) Inventor: Shaojun Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/360,308

(22) Filed: Mar. 21, 2019

(65) Prior Publication Data
US 2019/0212568 A1 Jul. 11, 2019

Related U.S. Application Data

(63) Continuation of application No. PCT/CN2016/100207, filed on Sep. 26, 2016.

(51) Int. Cl.
*G02B 27/01* (2006.01)
*G02B 30/00* (2020.01)

(52) U.S. Cl.
CPC ......... *G02B 27/0176* (2013.01); *G02B 30/00* (2020.01); *G02B 2027/0134* (2013.01); *G02B 2027/0154* (2013.01); *G02B 2027/0178* (2013.01)

(58) Field of Classification Search
CPC ............... G02B 27/0176; G02B 30/00; G02B 2027/0134; G02B 2027/0154; G02B 2027/0178
See application file for complete search history.

(56) References Cited

U.S. PATENT DOCUMENTS

| 6,144,347 A | 11/2000 | Mizoguchi et al. |
| 2011/0013277 A1 | 1/2011 | Cummings et al. |
| 2017/0102549 A1* | 4/2017 | Lee .................... G02B 27/0179 |

FOREIGN PATENT DOCUMENTS

| CN | 104849863 A | 8/2015 |
| CN | 104932103 A | 9/2015 |
| CN | 205139465 U | 4/2016 |
| CN | 105549204 A | 5/2016 |
| CN | 205333965 U | 6/2016 |
| CN | 205374877 U | 7/2016 |
| CN | 205450451 U | 8/2016 |

(Continued)

OTHER PUBLICATIONS

World Intellectual Property Organization (WIPO) International Search Report and Written Opinion for PCT/CN2016/100207 dated Jun. 22, 2017 8 Pages.

*Primary Examiner* — Peter D McLoone
(74) *Attorney, Agent, or Firm* — Anova Law Group, PLLC

(57) ABSTRACT

An adjustment mechanism includes a driving assembly and a sliding assembly. The driving assembly includes a mounting base, a toggle wheel, a gear, and a rotating shaft. The gear is non-rotatably connected to the toggle wheel. The rotating shaft is inserted through the toggle wheel and rotatably mounted at the mounting base. The sliding assembly includes a first sliding component connected to a first lens barrel and including a first rack, and a second sliding component connected to a second lens barrel and including a second rack. The gear is sandwiched between the first sliding component and the second sliding component, and is engaged with the first rack and the second rack.

19 Claims, 10 Drawing Sheets

(56) References Cited

FOREIGN PATENT DOCUMENTS

| | | |
|---|---|---|
| CN | 205485061 U | 8/2016 |
| CN | 206074917 U | 4/2017 |
| KR | 20160097858 A | 8/2016 |

* cited by examiner

ADJUSTMENT MECHANISM AND VIEWING APPARATUS USING THE SAME

CROSS-REFERENCE TO RELATED APPLICATION

This application is a continuation application of International Application No. PCT/CN2016/100207, filed on Sep. 26, 2016, the entire contents of which are incorporated herein by reference.

TECHNICAL FIELD

The present disclosure relates to optical device technology and, more particularly, to an adjustment mechanism and a viewing apparatus using the same.

BACKGROUND

As an emerging technology, 3D viewing technology has a good development prospect in the entertainment field. Head-mounted viewing devices stereoscopically display a two-dimensional (2D) image more to a user by utilizing the 3D viewing technology. As such, the user experiences a huge impact and extreme shock brought by the stereoscopic version, and hence has an immersive viewing experience. However, in the conventional display devices, a distance between two lens barrels is generally fixed, but different users have different pupillary distance (PD). As such, the user who has the PD inconsistent with the distance between the two lens barrels is prone to have a visual fatigue when wearing the display device, thereby reducing the comfort that the display device brings to the user.

SUMMARY

In accordance with the disclosure, there is provided an adjustment mechanism including a driving assembly and a sliding assembly. The driving assembly includes a mounting base, a toggle wheel, a gear, and a rotating shaft. The gear is non-rotatably connected to the toggle wheel. The rotating shaft is inserted through the toggle wheel and rotatably mounted at the mounting base. The sliding assembly includes a first sliding component connected to a first lens barrel and including a first rack, and a second sliding component connected to a second lens barrel and including a second rack. The gear is sandwiched between the first sliding component and the second sliding component, and is engaged with the first rack and the second rack.

Also, in accordance with the disclosure, there is provided an adjustment mechanism including a driving assembly, a sliding assembly, and a transmission assembly connected between the driving assembly and the sliding assembly. The driving assembly includes a mounting base, a toggle wheel, and a rotating shaft. The rotating shaft is inserted through the toggle wheel and rotatably mounted at the mounting base. The sliding assembly includes a first sliding component connected to a first lens barrel and including a first rack, and a second sliding component connected to a second lens barrel and including a second rack. The transmission assembly includes a driving wheel fixed to the toggle wheel, a driven wheel, a driving belt sleeved on the driving wheel and the driven wheel, and a gear fixed to the driven wheel. The gear is sandwiched between the first sliding component and the second sliding component, and is engaged with the first rack and the second rack.

Also, in accordance with the disclosure, there is provided a viewing apparatus including a housing, an optical mechanism mounted at the housing and including a first lens barrel and a second lens barrel, and an adjustment mechanism. The adjustment mechanism includes a driving assembly and a sliding assembly. The driving assembly includes a mounting base, a toggle wheel, a gear, and a rotating shaft. The gear is non-rotatably connected to the toggle wheel. The rotating shaft is inserted through the toggle wheel and rotatably mounted at the mounting base. The sliding assembly includes a first sliding component connected to the first lens barrel and including a first rack, and a second sliding component connected to the second lens barrel and including a second rack. The gear is sandwiched between the first sliding component and the second sliding component, and is engaged with the first rack and the second rack.

DESCRIPTION OF MAIN COMPONENTS AND REFERENCE NUMERALS

Figure 1:
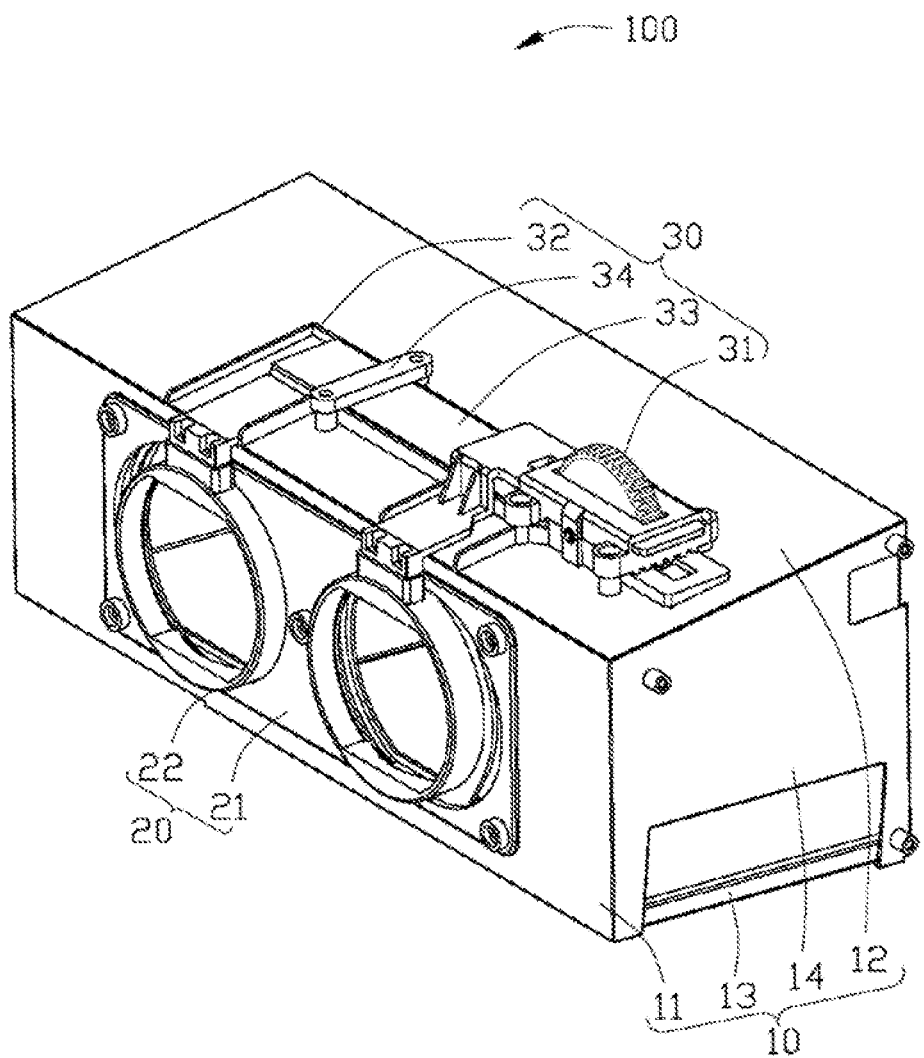
FIG. 1 is a perspective view of a viewing apparatus according to an embodiment of the disclosure.

| | |
|---|---|
| Viewing apparatus | 100, 200, 300, 400 |
| Housing | 10, 210, 310, 410 |
| Front panel | 11, 2110, 3110, 4110 |
| Mounting groove | 111, 2101, 3101, 4101 |
| Window | 112, 2102, 3102, 4102 |
| Top panel | 12, 2120, 3120, 4120 |
| Receiving hole | 121 |
| Bottom panel | 13, 2130, 3130, 4130 |
| Side panel | 14, 2140, 3140, 4140 |
| Optical mechanism | 20, 220, 320, 420 |
| Fixing plate | 21, 2210, 3210, 4210 |
| Avoidance hole | 211 |
| Lens barrel | 22, 2220, 3220, 4220 |
| Barrel-body | 221 |
| Engaging slot | 2211 |
| Flange | 222 |
| Adjustment mechanism | 30, 230 |
| Driving assembly | 31, 2310 |
| Mounting base | 311, 2301 |
| Press plate | 3111 |
| Support block | 3112 |
| Support bar | 3113 |
| First groove | 3114 |
| Press block | 3115 |
| Second groove | 3116 |
| Guiding groove | 3117 |

-continued

| Toggle wheel | 312, 2302 |
| --- | --- |
| Body | 3121 |
| Gear | 3122, 2354 |
| Anti-slip texture | 3123 |
| Central hole | 3124 |
| Rotating shaft | 313, 2303 |
| Gasket | 314, 2304 |
| Guiding assembly | 32, 2320 |
| Baffle | 321 |
| Sliding groove | 322 |
| Limiting groove | 323 |
| First limiting groove | 3231 |
| Second limiting groove | 3232 |
| Sliding assembly | 33, 2330 |
| First sliding component | 331, 2331 |
| First sliding plate | 3311 |
| First connecting plate | 3312 |
| First avoidance groove | 3313 |
| First rack | 3314, 2333 |
| First buckle | 3315 |
| Second sliding component | 332, 2332 |
| Second sliding plate | 3321 |
| Second connecting plate | 3322 |
| Second avoidance groove | 3323 |
| Second rack | 3324, 2334 |
| Second buckle | 3325 |
| Limiting component | 34, 2340 |
| Transmission assembly | 2350 |
| Driving wheel | 2351 |
| Driven wheel | 2352 |
| Transmission belt | 2353 |
| Lens | 3240, 4240 |
| Sealing ring | 3250 |
| Dustproof pad | 4250 |
| Connecting hole | 4251 |

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "connecting" to a second component, it is intended that the first component may be directly connected to the second component or may be indirectly connected to the second component via a third component between them. When a first component is referred to as "arranged" at a second component, it is intended that the first component may be directly arranged at the second component or may be indirectly arranged at the second component via a third component between them.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed. The terms "perpendicular," "horizontal," "left," "right," and similar expressions used herein are merely intended to distinguish names of components and not intended to limit a specific positional relationship.

Exemplary embodiments will be described with reference to the accompanying drawings. In the situation where the technical solutions described in the embodiments are not conflicting, they can be combined.

Figure 2:
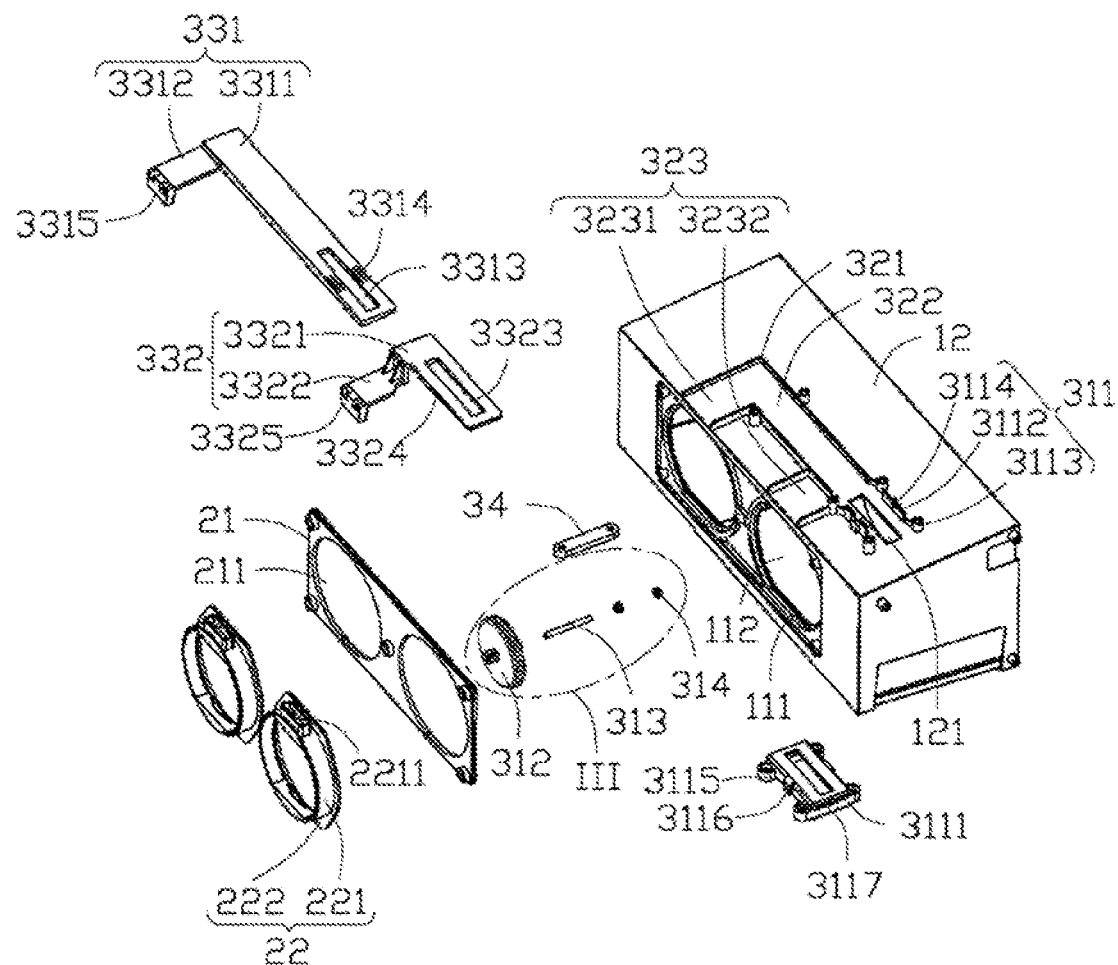
FIG. 2 is an exploded view of the viewing apparatus in FIG. 1.
Figure 3:
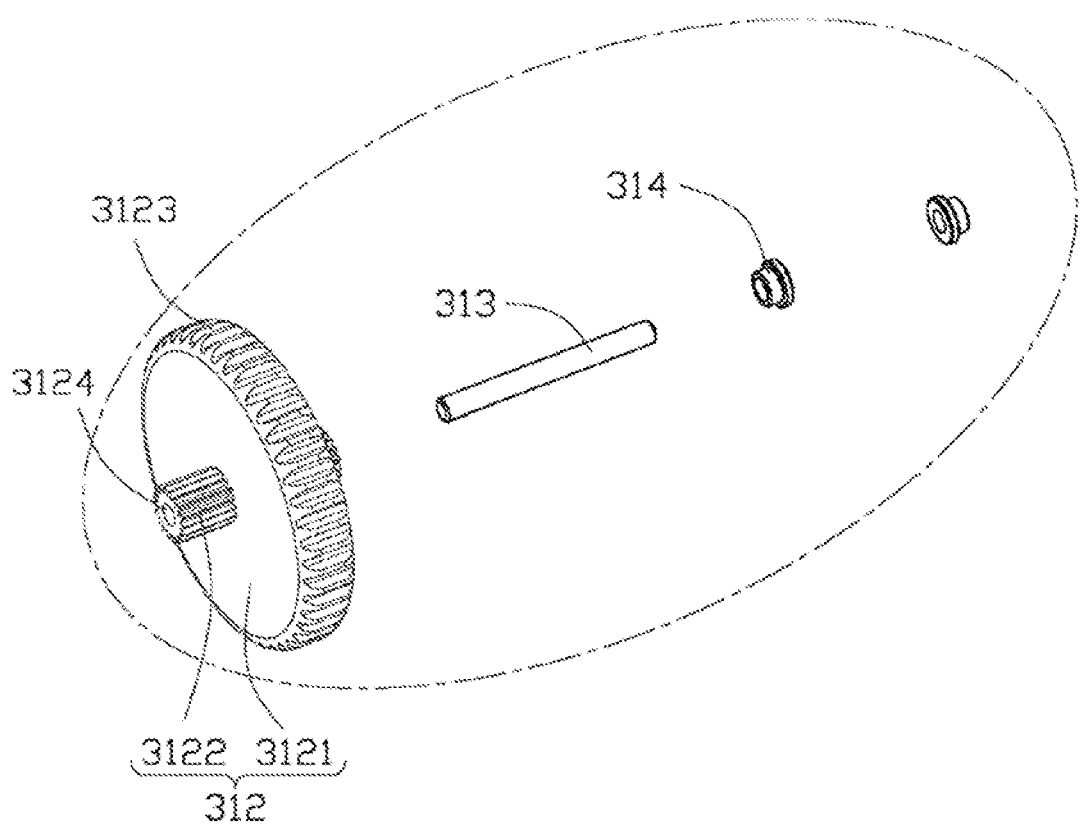
FIG. 3 is an enlarged view of a portion III of the viewing apparatus in FIG. 2.
Figure 4:
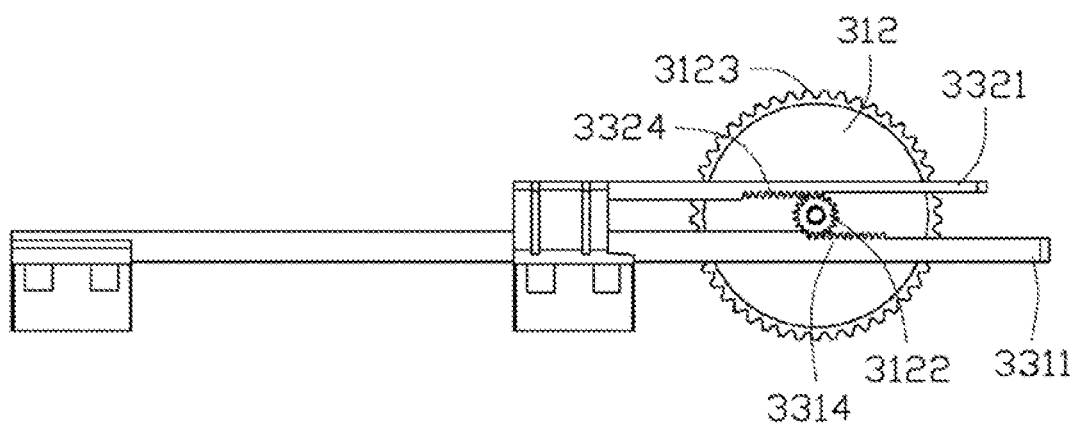
FIG. 4 is a partial schematic view of the viewing apparatus in FIG. 1.

FIG. 1 is a perspective view of a viewing apparatus 100 consistent with the disclosure. FIG. 2 is an exploded view of the viewing apparatus 100 consistent with the disclosure. FIG. 3 is an enlarged view of a portion III of the viewing apparatus 100 consistent with the disclosure. FIG. 4 is a partial schematic view of the viewing apparatus 100 consistent with the disclosure.

As shown in FIGS. 1 to 4, the viewing apparatus 100 includes a housing 10, and an optical mechanism 20 and an adjustment mechanism 30 mounted at the housing 10. The optical mechanism 20 can be configured to perform a virtual or enhanced visualization processing on an image, such that the user can experience a stereoscopic vision. The adjustment mechanism 30 can be configured to adjust the optical mechanism 20 to adapt the optical mechanism 20 to pupillary distances (PDs) of different people, thereby improving the comfort that the viewing apparatus 100 brings to the user.

In some embodiments, the housing 10 includes a front panel 11, a top panel 12, a bottom panel 13, and two side panels 14. The two side panels 14 are spaced apart in parallel, and each of the two side panels 14 has an approximately rectangular shape. The front panel 11 is connected to the top panel 12 and the bottom panel 13. Ends of the front panel 11, ends of the top panel 12, and ends of the bottom panel 13 abut against corresponding sides of the two side panels 14, respectively, such that the housing 10 can have an approximately rectangular-shape structure. The front panel 11 has an approximately rectangular shape and includes a mounting groove 111 and two windows 112. The mounting groove 111 has an approximately rectangular shape and is opened at an approximately central position of the front panel 11. The two windows 112 are spaced apart at a bottom surface of the mounting groove 111 and penetrate through the front panel 11. In some embodiments, each of the two windows 112 has an approximately elliptical shape, but is not limited thereto. The top panel 12 has an approximately rectangular shape and can be configured to mount the adjustment mechanism 30.

The optical mechanism 20 includes a fixing plate 21 and two lens barrels 22. The two lens barrels 22 are mounted in the mounting groove 111 of the front panel 11. The fixing plate 21 is fixedly connected to the front panel 11 and covers the mounting groove 111, such that the two lens barrels 22 can be limited in the mounting groove 111 and can move in opposite directions along the mounting groove 111 toward or away from each other. In some embodiments, the optical mechanism 20 can further include two eyepieces (not shown in FIGS. 1 to 4) that are mounted in the two lens barrels 22.

In some embodiments, each of the two lens barrels 22 includes a barrel-body 221 and two flanges 222. The barrel-body 221 can have an approximately hollow cylindrical-shape to facilitate an installation of the corresponding eyepiece. The two flanges 222 are spaced apart and fixedly connected to an end of the barrel-body 221 toward the mounting groove 111 and extend radially outward along the barrel-body 221 to abut against opposite side walls of the rectangular mounting groove 111. The two flanges 222 of each of the two lens barrels 22 are respectively sandwiched between the corresponding fixing plate 21 and a bottom of the corresponding mounting groove 111, such that the two lens barrels 22 can be stably limited in the mounting groove 111 and can be movably mounted at the front panel 11.

The fixing plate 21 includes two avoidance holes 211 opened at positions corresponding to positions of the two windows 112. Each of the two avoidance holes 211 has approximately elliptical shape and a size of each of the two avoidance holes 211 matches the size of the corresponding window 112. The barrel-bodies 221 of the two lens barrels 22 protrude from the fixing plate 21 through the corresponding avoidance hole 211, respectively. In some embodiments, each of the two barrel-bodies 221 includes an engaging slot 2211 at a side of the barrel-body 211 facing toward the adjustment mechanism 30.

The adjustment mechanism 30 is mounted at the top panel 12 and includes a driving assembly 31, a guiding assembly 32, a sliding assembly 33, and a limiting component 34. The driving assembly 31 and the guiding assembly 32 are respectively mounted at the top panel 12, the sliding assembly 33 is slidably mounted at the top panel 12, and the two lens barrels 22 are detachably connected to the sliding assembly 33. The driving assembly 31 can drive the sliding assembly 33 to slide along the guiding assembly 32 to adjust the pupillary distance (PD) between the two lens barrels 22. The limiting component 34 is fixed to the top panel 12 to limit the sliding assembly 33 and prevent the sliding assembly 33 from being disengaged from the guiding assembly 32.

In some embodiments, the driving assembly 31 includes a mounting base 311, a toggle wheel 312, a rotating shaft 313, and two gaskets 314. The mounting base 311 is fixed to the top panel 12, and the rotating shaft 313 is inserted through the toggle wheel 312 and rotatably mounted at the mounting base 311. The two gaskets 314 are respectively sleeved on two opposite ends of the rotating shaft 313 to avoid a looseness between the rotating shaft 313 and the mounting base 311, thereby enhancing a hand feeling of the user when toggling the toggle wheel 312.

The mounting base 311 includes a press plate 3111, two support blocks 3112, and four support bars 3113. The press plate 3111 has an approximately rectangular shape and is arranged parallel to the top panel 12. The four support bars 3113 are vertically connected between the top panel 12 and the press plate 3111, respectively, and correspond to four corners of the rectangular press plate 3111. In some embodiments, two of the four support bars 3113 are arranged at a side of the guiding assembly 32 and the other two of the four support bars 3113 are arranged at the other side of the guiding assembly 32. Two support blocks 3112 are respectively fixed at the top panel 12 and are located at the two sides of the guiding assembly 32. Each of the two support blocks 3112 is arranged between the two support bars 3113 on the same side, and a first groove 3114 is recessed from a side of each of the two support blocks 3112 away from the top panel 12 for receiving lower half portions of the gaskets 314 sleeved on ends of the rotating shaft 313. Two press blocks 3115 are protruded from a side of the press plate 3111 toward the top panel 12. The two press blocks 3115 corresponds to the two support blocks 3112, respectively. Each of the two press blocks 3115 includes a second groove 3116 that is recessed from a side of each of the two support blocks 3112 toward the top panel 12 for receiving upper half portions of the gaskets 314 sleeved at the ends of the rotating shaft 313.

The first groove 3114 and the second groove 3116 can cooperate with each other to form a receiving hole (not shown in FIGS. 1 to 4), and the two gaskets 314 can be received in the receiving hole. In some embodiments, the first groove 3114 and the second groove 3116 can have an approximately semi-circular shape, but are not limited thereto.

The toggle wheel 312 includes a body 3121 and two gears 3122. The body 3121 has an approximately disk shape. The body 3121 includes anti-slip texture 3123 along a peripheral wall of the body 3121. The anti-slip texture 3123 can be configured to prevent a sliding phenomenon when the user toggling the body 3121. The two gears 3122 are symmetrically fixed to two sides of the body 3121, and are arranged coaxially with the disk-shape body 3121. The toggle wheel 312 further includes a central hole 3124. The central hole 3124 extends through the body 3121 and the two gears 3122 along an axial direction of the body 3121 and the two gears 3122. The rotating shaft 313 is fixedly inserted through the central hole 3124, and the two ends of the rotating shaft 313 extend out of the central hole 3124, such that the two gaskets 314 can be respectively sleeved on the two ends of the rotating shaft 313.

In the embodiments, the top panel 12 includes a receiving hole 121 at a position corresponding to the body 3121 of the toggle wheel 312. The receiving hole 121 has an approximately elongated shape, and is configured to receive a portion of the body 3121 of the toggle wheel 312 that protrudes from the top panel 12, such that the body 3121 can avoid the top panel 12 and perform a rotation state.

The guiding assembly 32 includes a plurality of baffles 321, and the plurality of baffles 321 are respectively fixedly arranged at the top panel 12. The plurality of baffles 321 cooperate with the top plate 12 to form a sliding groove 322 and two limiting grooves 323. The two limiting grooves 323 includes a first limiting groove 3231 and a second limiting groove 3232. The first limiting groove 3231 and the second limiting groove 3232 are respectively connected to a side of the sliding groove 322 facing the front panel 11 and extend toward the front panel 11 for limiting the sliding assembly 33. The first limiting groove 3231 cooperates with the sliding groove 322 to form an approximately L-shape structure. In some embodiments, the driving assembly 31 is arranged adjacent to an end of the sliding groove 322.

The sliding assembly 33 includes a first sliding component 331 and a second sliding component 332. The first sliding component 331 and the second sliding component 332 can cooperate with each other to drive the two lens barrels 22 to move in opposite directions along the mounting groove 111 toward or away from each other.

The first sliding component 331 has an approximately L-shape structure and includes a first sliding plate 3311 and a first connecting plate 3312. The first sliding plate 3311 is slidably arranged at the bottom of the sliding groove 322, and includes a first avoidance groove 3313 and two first racks 3314 at an end of the first sliding plate 3311 toward the driving assembly 31. The first avoidance groove 3313 has an approximately elongated-shape and corresponds to the receiving hole 121 of the top panel 12. As such, when the first sliding plate 3311 slides along the sliding groove 322, the first avoidance groove 3313 can achieve an avoidance of the body 3121 of the toggle wheel 312. In some embodiments, a length of the first avoidance groove 3313 is slightly larger than a length of the receiving hole 121, but is not limited thereto, as long as the length of the receiving hole 121 can satisfy that the top panel 121 does not interfere with the rotation of the toggle wheel 312, and the length of the first avoidance groove 3313 can satisfy that the first avoidance groove 3313 can avoid the toggle wheel 312 when the first sliding plate 3311 is sliding along the sliding groove 322. The two first racks 3314 are respectively arranged at a side of the first sliding plate 3311 facing away from the top panel 12 and symmetrically arranged at opposite sides of the first avoidance groove 3313. The two first racks 3314 are respectively engaged with a side of the corresponding gear 3122 of the toggle wheel 312 facing the top panel 12. When the user toggles the toggle wheel 312 to rotate toward the first avoidance groove 3313, the two gears 3122 can rotate with the toggle wheel 312. The two gears 3122 are engaged with the two first racks 3314, thus, when the two gears 3122 rotate toward the first avoidance groove 3313, the two gears 3122 can drive the first sliding plate 3311 to slide along the sliding groove 322 and away from the first avoidance groove 3313. On the other hand, when the user toggles the toggle wheel 312 to rotate away from the first avoidance groove 3313, the two gears 3122 can drive the first sliding plate 3311 to slide along the sliding groove 322 and toward the first avoidance groove 3313.

The first connecting plate 3312 is vertically connected to an end of the first sliding plate 3311 away from the driving assembly 31, and is movably received in the first limiting groove 3231. A first buckle 3315 is formed at an end of the first connecting plate 3312 away from the first sliding plate 3311, and the first buckle 3315 can be inserted in the engaging slot 2211 of the corresponding lens barrel 22, such that first connecting plate 3312 can be engaged with the corresponding lens barrel 22. The first sliding plate 3311 can slide along the sliding groove 322, and drive the corresponding lens barrel 22 to slide along the mounting groove 111 toward or away from the other lens barrel 22 via the first connecting plate 3312 to adjust the relative position of the two lens barrels 22 in the mounting groove 111.

In some embodiments, the first connecting plate 3312 has an approximately rectangular shape, and a width of the first limiting groove 3231 is greater than a width of the first connecting plate 3312 to provide a space for the first connecting plate 3312 to move in the first limiting groove 3231, but is not limited thereto.

The second sliding component 332 includes a second sliding plate 3321 and a second connecting plate 3322. In some embodiments, a guiding groove 3117 is opened in the press plate 3111 at a position corresponding to the second sliding plate 3321. The second sliding plate 3321 can be slidably through the guiding groove 3117 and arranged above the first sliding plate 3311. The second sliding plate 3321 includes a second avoidance groove 3323 and two second racks 3324 at an end of the second sliding plate 3321 toward the driving assembly 31. The second avoidance groove 3323 has an approximately elongated-shape and corresponds to the receiving hole 121 of the top panel 12. As such, when the second sliding plate 3321 slides along the sliding groove 322, the second avoidance groove 3323 can achieve an avoidance of the body 3121 of the toggle wheel 312. In some embodiments, a length of the second avoidance groove 3323 is slightly larger than the length of the receiving hole 121. The two second racks 3324 are both formed at a side of the second sliding plate 3321 facing toward the top panel 12 and symmetrically arranged at opposite sides of the second avoidance groove 3323. The two second racks 3324 are each engaged with a side of the corresponding gear 3122 of the toggle wheel 312 facing away from the top panel 12. When the user toggles the toggle wheel 312 to rotate toward the second avoidance groove 3323, the two gears 3122 can rotate with the toggle wheel 312. Since the two gears 3122 are engaged with the two second racks 3324, when the two gears 3122 rotate toward the second avoidance groove 3323, the two gears 3122 can drive the second sliding plate 3321 to slide along the sliding groove 3117 and toward the second avoidance groove 3323. On the other hand, when the user toggles the toggle wheel 312 to rotate away from the second avoidance groove 3323, the two gears 3122 can drive the second sliding plate 3321 to slide along the sliding groove 3117 and away from the second avoidance groove 3323.

The second connecting plate 3322 is vertically connected to an end of the second sliding plate 3321 away from the driving assembly 31, and is movably received in the second limiting groove 3232. A second buckle 3325 is formed at an end of the second connecting plate 3312 away from the second sliding plate 3321, and the second buckle 3325 can be inserted in the corresponding engaging slot 2211 of the lens barrel 22, such that second connecting plate 3322 can be engaged with the corresponding lens barrel 22. The second sliding plate 3321 can slide along the sliding groove 322, and drive the corresponding lens barrel 22 to slide along the mounting groove 111, so as to adjust the position of the corresponding lens barrel 22 in the mounting groove 111.

In some embodiments, a stepped structure (not shown in FIGS. 1 to 4) can be formed at a joint between the second connecting plate 3322 and the second sliding plate 3321, and a step difference of the stepped structure can match a difference of a height of the guiding groove 3117 with respect to a height of the top panel 12, such that the second connecting plate 3322 can slide along a bottom surface of the second limiting groove 3232 while the second sliding plate 3321 is sliding along the guiding groove 3172, and can be limited between the baffles 321 on the two sides of the second limiting groove 3232.

In some embodiments, the second connecting plate 3322 has an approximately rectangular shape, and a width of the second limiting groove 3232 is greater than a width of the second connecting plate 3322 to provide a space for the second connecting plate 3322 to move in the second limiting groove 3232, but is not limited thereto.

In some embodiments, a connection between the first connecting plate 3312 and the corresponding lens barrel 22 and a connection between the second connecting plate 3322 and the corresponding lens barrel 22 are not limited to the connection manner of the buckle and the engaging slot as described above, as long as the two lens barrels 22 can be detachably connected to the sliding assembly 33.

The limiting component 34 is fixed to the top panel 12 to limit the first sliding plate 3311 of the first sliding component 331 in the sliding groove 322, thereby effectively preventing the first sliding plate 3311 from slipping out of the sliding groove 322 and further improving a stability of the structure of the adjustment mechanism 30. In some embodiments, the limiting component 34 has an approximately elongated shape, and two ends of the limiting component 34 are respectively fixed to the two sides of the sliding groove 322, but not limited thereto. The limiting component 34 can also include another structure, as long as the first sliding plate 3311 of the first sliding component 331 can be limited in the sliding groove 322.

When the distance between the two lens barrels 22 of the viewing apparatus 100 needs to be adjusted to adapt to the PD of the user, because the two gears 3122 of the toggle wheel 312 are respectively engaged with the first rack 3314 of the first sliding plate 3311 and the second rack 3324 on the second sliding plate 3321, when the user toggles the toggle wheel 312, the two gears 3122 of the toggle wheel 312 can drive the first sliding plate 3311 and the second sliding plate 3321 to move in opposite directions, such that the distance between the two lens barrels 22 can be adjusted to adapt to the PD of the user.

In some embodiments, the number of the gear 3122, the number of the first rack 3314, and the number of the second rack 3324 can be not limited to two, and may be one or two or more.

In some other embodiments, both the guiding assembly 32 and the limiting component 34 can be omitted.

Consistent with the disclosure, the viewing device 100 can adjust the distance between the two lens barrels 22 by providing the adjustment mechanism 30 and adapt the distance between the two lens barrels 22 to the PD of the user, thereby enhancing the comfort experience that the viewing apparatus 100 brings to the user.

Figure 5:
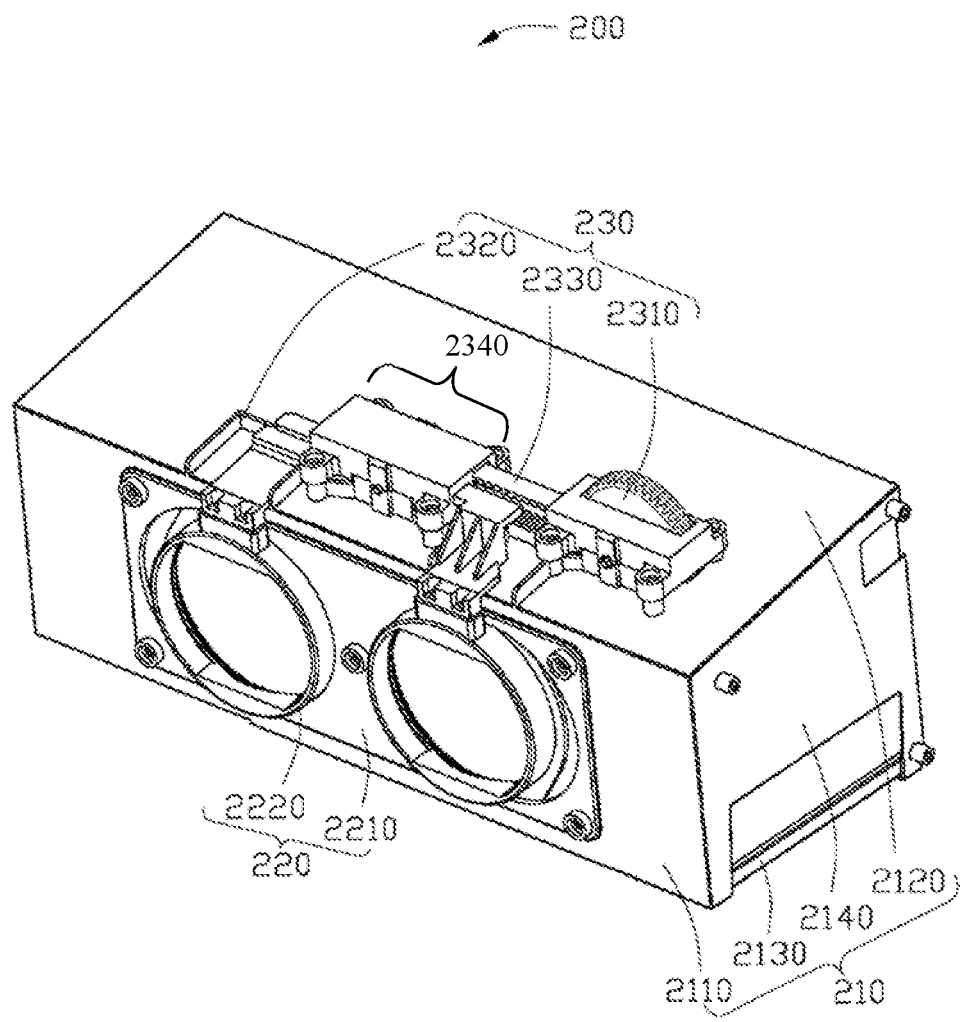
FIG. 5 is a perspective view of another viewing apparatus according to an embodiment of the disclosure.
Figure 6:
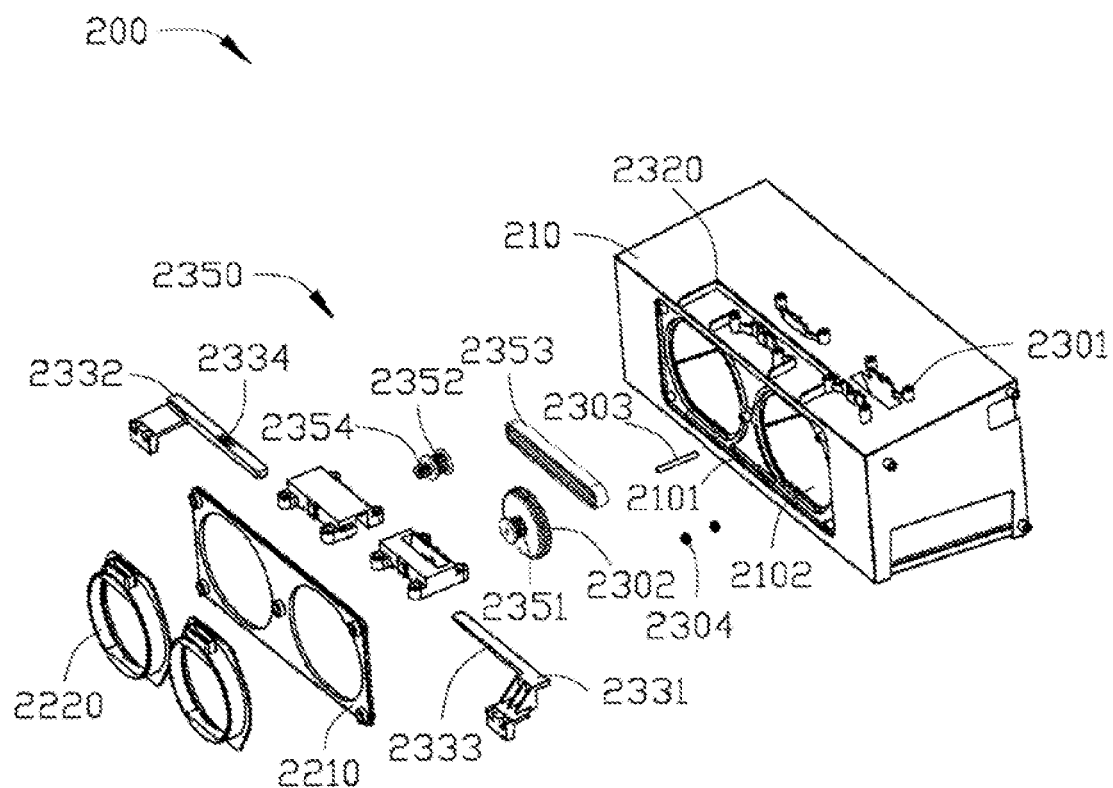
FIG. 6 is an exploded view of the viewing apparatus in FIG. 5.
Figure 7:
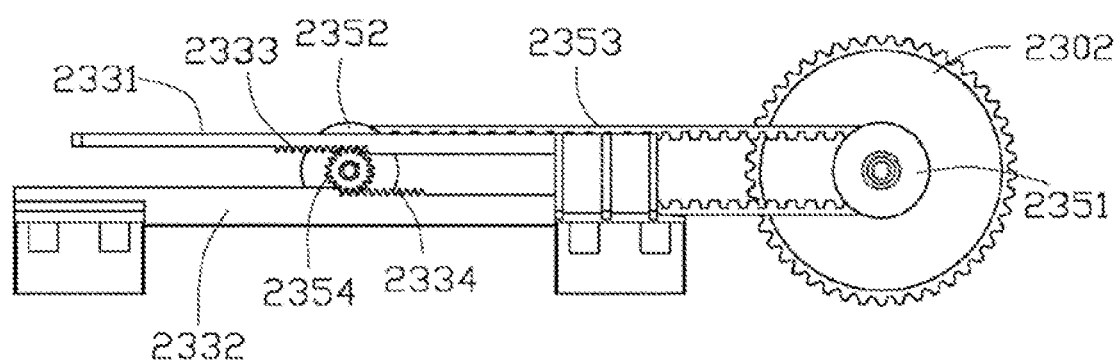
FIG. 7 is a partial schematic view of the viewing apparatus in FIG. 5.

FIG. 5 is a perspective view of a viewing apparatus 200 consistent with the disclosure. FIG. 6 is an exploded view of the viewing apparatus 200 consistent with the disclosure. FIG. 7 is a partial schematic view of the viewing apparatus 200 consistent with the disclosure.

As shown in FIGS. 5 to 7, a structure of the viewing apparatus 200 shown in FIG. 5 is similar to a structure of the viewing apparatus 100 shown in FIG. 1. The viewing apparatus 200 includes a housing 210, an optical mechanism 220 mounted at the housing 210, and an adjustment mechanism 230. The housing 210 includes a front panel 2110, a top panel 2120, a bottom panel 2130, and two side panels 2140. The front panel 2110 includes a mounting groove 2101 and two windows 2102. The optical mechanism 220 includes a fixed plate 2210 and two lens barrels 2220. The two lens barrels 2220 are respectively arranged in the mounting groove 2101 of the front panel 2110. The fixing plate 2210 is fixedly connected to the front panel 2110 and covers the mounting groove 2101, such that the two lens barrels 2220 can be limited in the mounting groove 2101, and can move in opposite directions along the mounting groove 2101 toward or away from each other. The adjustment mechanism 230 includes a driving assembly 2310, a guiding assembly 2320, a sliding assembly 2330, and a limiting component 2340. The driving assembly 2310 and the guiding assembly 2320 are respectively mounted at the top panel 2120. The sliding assembly 2330 can be slidably mounted at the top panel 2120 and can be slide along the guiding assembly 2320. The driving assembly 2310 includes a mounting base 2301, a toggle wheel 2302, a rotating shaft 2303, and two gaskets 2304. The sliding assembly 2330 includes a first sliding component 2331 and a second sliding component 2332. The first sliding component 2331 and the second sliding component 2332 can cooperate with each other to drive the two lens barrels 2220 to move in opposite directions along the mounting groove 2101 toward or away from each other. A first rack 2333 and a second rack 2334 are respectively formed at sides of the first sliding component 2331 and the second sliding component 2332 that face each other. The difference between the viewing apparatus 200 and the viewing apparatus 100 is that the adjustment mechanism 230 further includes a transmission assembly 2350 connected between the driving assembly 2310 and the sliding assembly 2330. The driving assembly 2310 can drive the first sliding component 2331 and the second sliding member 2332 to slide in opposite directions via the transmission assembly 2350. In some embodiments, the transmission assembly 2350 includes a driving wheel 2351, a driven wheel 2352, a driving belt 2353, and a gear 2354. The driving wheel 2351 is coaxially fixed to a side of the toggle wheel 2302. The driven wheel 2352 is rotatably mounted at the top panel 2120. The driving belt 2353 is sleeved on the driving wheel 2351 and the driven wheel 2352. The gear 2354 is coaxially fixed at a side of the driven wheel 2352 toward the optical mechanism 220, and is sandwiched between the first sliding component 2331 and the second sliding component 2332 and engaged with the first rack 2333 and the second rack 2334, respectively. When the toggle wheel 2302 is toggled, the driving wheel 2351 can drive the driven wheel 2352 and the gear 2354 to rotate together through the driving belt 2353. Because of the engagement of the gear 2354 with the first rack 2333 and the second rack 2334, the first sliding component 2331 and the second sliding component 2332 can move in opposite directions to adjust the distance between the two lens barrels 2220 to adapt to the PD of the user.

Consistent with the disclosure, the viewing apparatus 200 can include the transmission component 2350 between the driving component 2310 and the sliding component 2330, such that the driving assembly 2310 can drive the sliding assembly 2330 to slide via the transmission assembly 2350, thereby facilitating the adjustment of the distance between the two lens barrels 2220.

Figure 8:
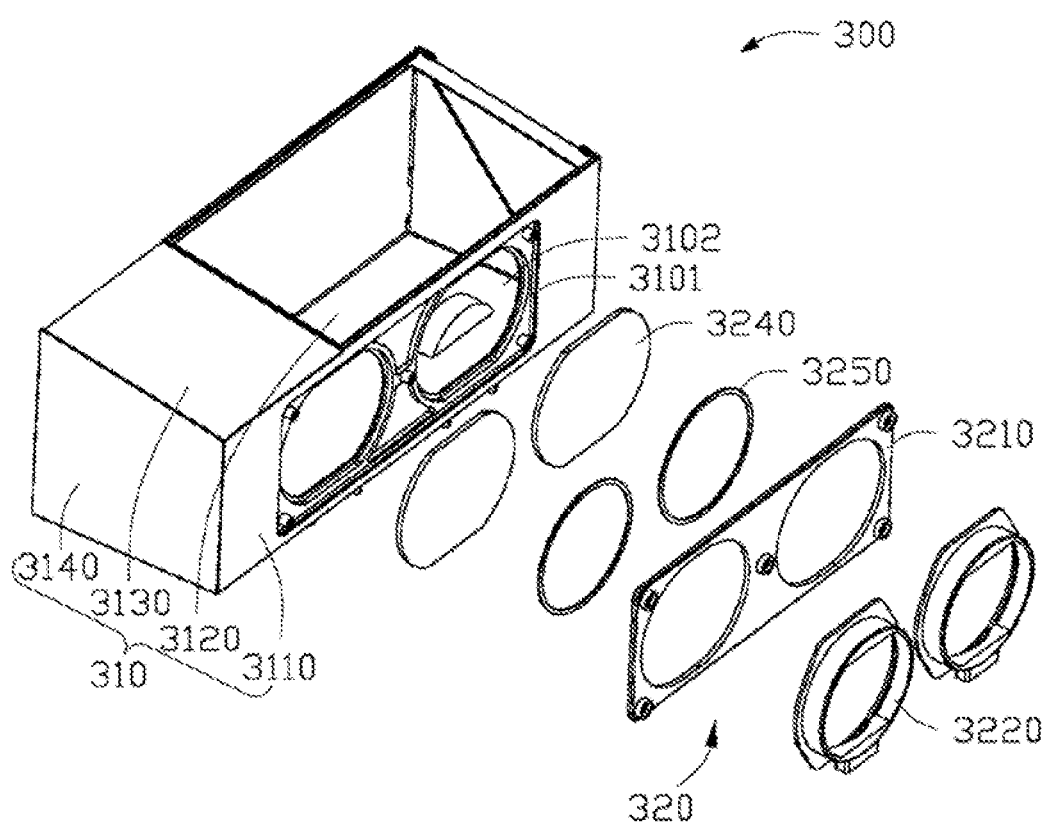
FIG. 8 is an exploded view of another viewing apparatus according to an embodiment of the disclosure.

FIG. 8 is an exploded view of a viewing apparatus 300 consistent with the disclosure. As shown in FIG. 8, a structure of the viewing apparatus 300 is similar to the structure of the viewing apparatus 100 shown in FIG. 1. The viewing device 300 includes a housing 310, an optical mechanism 320 mounted at the housing 310, and an adjustment mechanism (not shown in FIG. 8). The housing 310 includes a front panel 3110, a top panel 3120, a bottom panel 3130, and two side panels 3140. The front panel 3110 includes a mounting groove 3101 and two windows 3102. The optical mechanism 320 includes a fixing plate 3210 and two lens barrels 3220. The two lens barrels 3220 are respectively arranged at the mounting groove 3101 of the front panel 3110. The fixing plate 3210 is fixedly connected to the front panel 3110 and covers the mounting groove 3101, such that the two lens barrels 3220 can be limited in the mounting groove 3101 and can be moved in opposite directions along the mounting groove 3101 toward or away from each other. The difference between the viewing device 300 and viewing device 100 is that the optical mechanism 320 further includes two lenses 3240 and two sealing rings 3250. Each of the two lenses 3240 is fixed to the front panel 3110 and covers the corresponding window 3102. Each of the two sealing rings 3250 is arranged between the corresponding lens 3240 and the corresponding lens barrel 3220 to seal the lens barrel 3220 and the corresponding lens 3240.

Consistent with the disclosure, the viewing apparatus 300 can have the sealing ring 3250 sandwiched between the lens 3240 and the lens barrel 3220. When the lens barrel 3220 moves along the mounting groove 3101 and relative to the corresponding lens 3240, the sealing ring 3250 can prevent external dust from entering the viewing apparatus 300, further enhancing the viewing effect.

Figure 9:
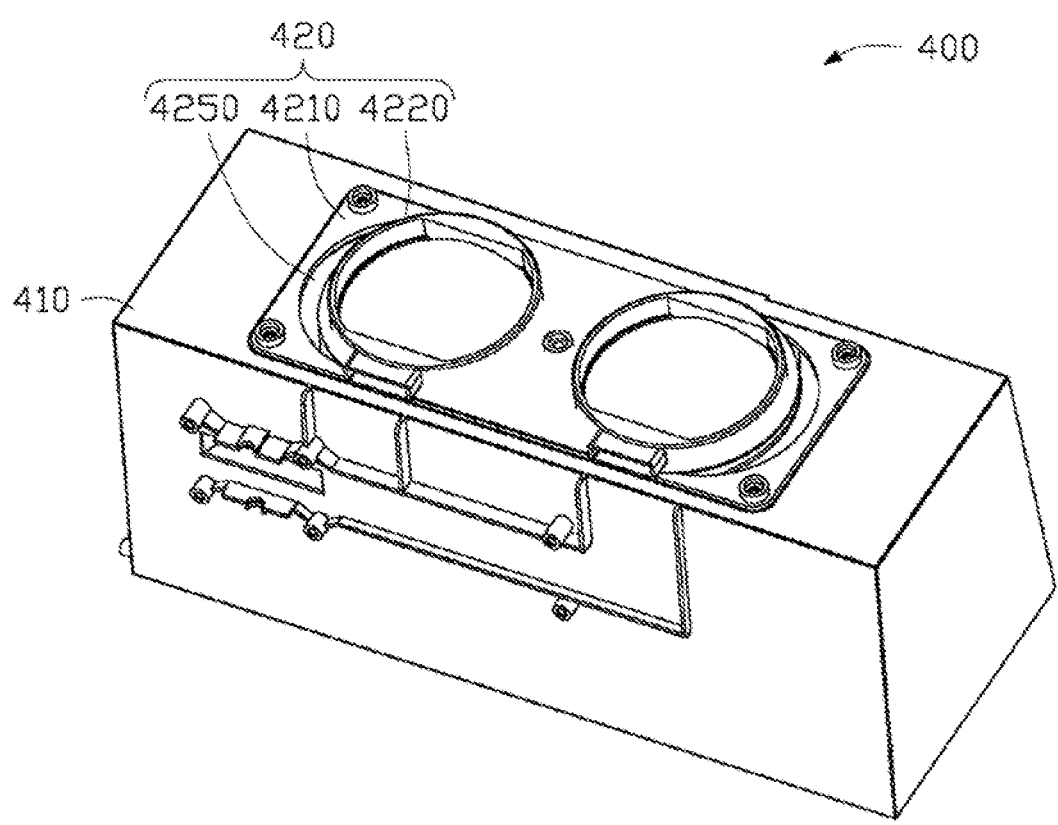
FIG. 9 is a schematic partial view of another viewing apparatus according to an embodiment of the disclosure.
Figure 10:
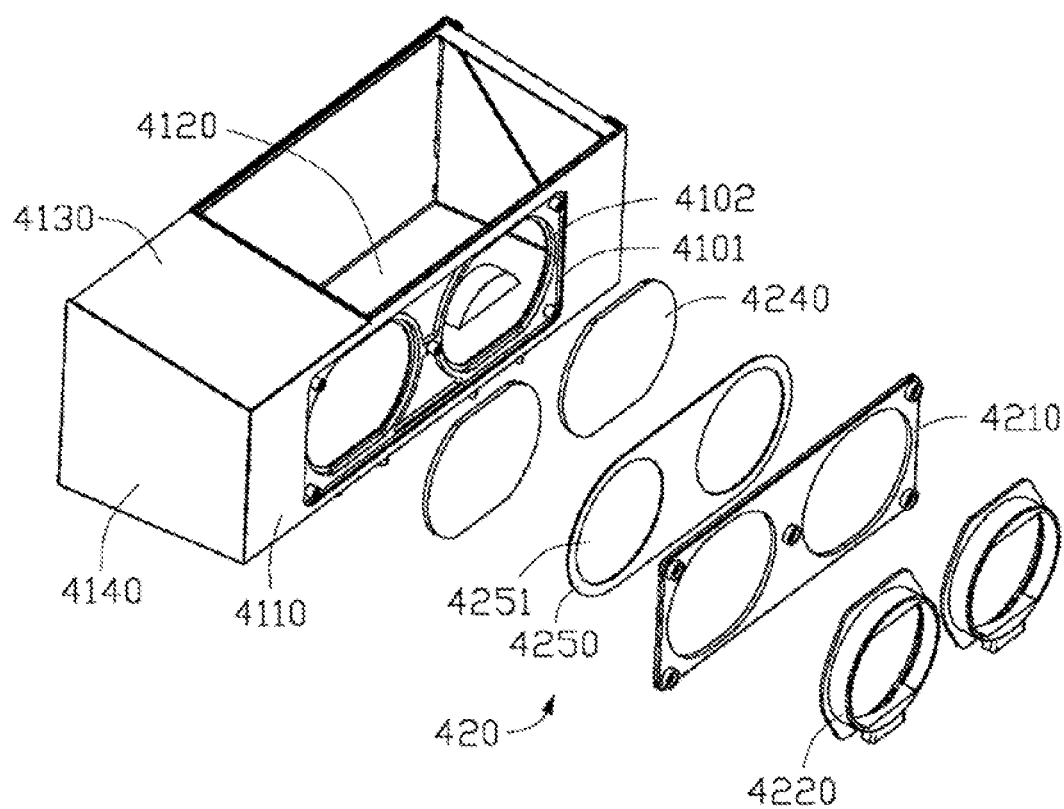
FIG. 10 is an exploded view of the viewing apparatus in FIG. 9.

FIG. 9 is a schematic partial view of a viewing apparatus 400 consistent with the disclosure. FIG. 10 is an exploded view of the viewing apparatus 400. A structure of the viewing apparatus 400 shown in FIG. 9 is similar to the structure of the viewing apparatus 300 shown in FIG. 8. As shown in FIG. 9, the viewing apparatus 400 includes a housing 410, an optical mechanism 420 mounted at the housing 410, and an adjustment mechanism (not shown in FIGS. 9 and 10). The housing 410 includes a front panel 4110, a top panel 4120, a bottom panel 4130, and two side panel 4140. The front panel 4110 includes a mounting groove 4101 and two windows 4102. The optical mechanism 420 includes a fixed plate 4210, two lens barrels 4220, and two lenses 4240. The two lens barrels 4220 are respectively arranged in the mounting groove 4101 of the front panel 4110. The fixing plate 4210 is fixedly connected to the front panel 4110 and covers the mounting groove 4101, such that the lens barrel 4220 can be limited in the mounting groove 4101, and can move in opposite directions along the mounting groove 4101 toward or away from each other. Each of the two lenses 4240 is fixed to the front panel 4110 and covers the corresponding window 4102. The difference between the viewing device 400 and the viewing device 300 is that the optical mechanism 420 further includes a dustproof pad 4250 having an approximately elliptical shape, and the dustproof pad 4250 is attached to the two lenses 4240. An outer edge of the dustproof pad 4250 is fixedly connected to the front panel 4110, and two connecting holes 4251 are respectively formed corresponding to the positions of the two lenses 4240, such that the two lens barrels 4220 are respectively connected to the dustproof pad 4250 through the two connecting holes 4251.

In some embodiments, the dustproof pad 4250 can be made of an elastic material. When the two lens barrels 4220 are moving along the mounting groove 4101 and relative to the corresponding lens 4240, the dustproof pad 4250 can be deformed along with a moving direction of the lens barrel 4220 to prevent the dustproof pad 4250 from affecting the movement of the lens barrel 4220.

Consistent with the disclosure, the viewing apparatus 400 can have the dustproof pad 4250 connected between the front panel 4110 and the lens barrel 3220. When the lens barrel 4220 moves along the mounting groove 4101 and relative to the corresponding lens 4240, the dustproof pad 4250 can prevent external dust from entering the viewing apparatus 400, effectively improving the viewing effect of the viewing apparatus 400.

It is intended that the embodiments be considered as exemplary only and not to limit the scope of the disclosure. Those skilled in the art will be appreciated that any modification or equivalents to the disclosed embodiments are intended to be encompassed within the scope of the present disclosure.

What is claimed is:

1. An adjustment mechanism comprising:
a driving assembly comprising a mounting base, a toggle wheel, a gear, and a rotating shaft, the gear being non-rotatably connected to the toggle wheel, and the rotating shaft being inserted through the toggle wheel and rotatably mounted at the mounting base;
a guiding assembly comprising a plurality of baffles forming a sliding groove; and
a sliding assembly comprising:
a first sliding component connected to a first lens barrel and comprising a first rack;
a second sliding component connected to a second lens barrel and comprising a second rack; and
a limiting component,
wherein:
the gear is sandwiched between the first sliding component and the second sliding component, and is engaged with the first rack and the second rack,
the first sliding component comprises a first sliding plate and the second sliding component comprises a second sliding plate,
the first sliding plate and the second sliding plate are slidably arranged in the sliding groove, and
the limiting component is configured to limit the first sliding plate of the first sliding component to the sliding groove.

2. The mechanism of claim 1, wherein:
the driving assembly further comprises two gaskets that are sleeved on two opposite ends of the rotating shaft, respectively.

3. The mechanism of claim 1, wherein:
the gear is fixedly connected to the toggle wheel;
a central hole extends through the toggle wheel and the gear; and
the rotating shaft fixedly penetrates through the central hole.

4. The mechanism of claim 1, wherein:
the guiding assembly further comprises a first limiting groove and a second limiting groove, the first limiting groove and the second limiting groove being connected to a same side of the sliding groove;
the first sliding component further comprises a first connecting plate;
the second sliding component further comprises a second connecting plate;
the first connecting plate is connected to an end of the first sliding plate away from the driving assembly and is movably received in the first limiting groove; and
the second connecting plate is connected to an end of the second sliding plate away from the driving assembly and is movably received in the second limiting groove.

5. The mechanism of claim 4, wherein:
the first lens barrel comprises a first engaging slot at a side of the first lens barrel that faces toward the adjustment mechanism;
the second lens barrel comprises a second engaging slot at a side of the second lens barrel that faces toward the adjustment mechanism;
the first connecting plate comprises a first buckle at an end of the first connecting plate that is away from the first sliding plate, the first buckle being inserted in the first engaging slot; and
the second connecting plate comprises a second buckle at an end of the second connecting plate that is away from the second sliding plate, the second buckle being inserted in the second engaging slot.

6. The mechanism of claim 4, wherein:
the first sliding plate comprises a first avoidance groove at an end of the first sliding plate that faces toward the driving assembly; and
the second sliding plate comprises a second avoidance groove at an end of the second sliding plate that faces toward the driving assembly.

7. The mechanism of claim 6, wherein:
the first sliding plate comprises two first racks arranged at two sides of the first avoidance groove; and
the second sliding plate comprises two second racks arranged at two sides of the second avoidance groove.

8. The mechanism of claim 6, wherein:
the mounting base comprises a guiding groove at a position corresponding to the second sliding plate; and
the second sliding plate is slidably through the guiding groove and is arranged above the first sliding plate.

9. The mechanism of claim 6, wherein a stepped structure is formed at a joint between the second connecting plate and the second sliding plate.

10. An adjustment mechanism comprising:
a driving assembly comprising a mounting base, a toggle wheel, and a rotating shaft, the rotating shaft being inserted through the toggle wheel and rotatably mounted at the mounting base;
a guiding assembly comprising a plurality of baffles forming a sliding groove;

a sliding assembly comprising:
  a first sliding component connected to a first lens barrel and comprising a first rack and a first sliding plate; and
  a second sliding component connected to a second lens barrel and comprising a second rack and a second sliding plate, the first sliding plate and the second sliding plate being slidably arranged in the sliding groove;
a limiting component configured to limit the first sliding plate of the first sliding component to the sliding groove; and
a transmission assembly connected between the driving assembly and the sliding assembly and comprising:
  a driving wheel fixed to the toggle wheel;
  a driven wheel;
  a driving belt sleeved on the driving wheel and the driven wheel; and
  a gear fixed to the driven wheel, sandwiched between the first sliding component and the second sliding component, and engaged with the first rack and the second rack.

11. A viewing apparatus comprising:
a housing;
an optical mechanism mounted at the housing and comprising a first lens barrel and a second lens barrel; and
an adjustment mechanism comprising:
  a driving assembly comprising a mounting base, a toggle wheel, a gear, and a rotating shaft, the gear being non-rotatably connected to the toggle wheel, and the rotating shaft being inserted through the toggle wheel and rotatably mounted at the mounting base;
  a guiding assembly comprising a plurality of baffles forming a sliding groove; and
  a sliding assembly comprising:
    a first sliding component connected to the first lens barrel and comprising a first rack; and
    a second sliding component connected to the second lens barrel and comprising a second rack; and
  a limiting component,
  wherein:
    the gear is sandwiched between the first sliding component and the second sliding component, and is engaged with the first rack and the second rack,
    the first sliding component comprises a first sliding plate and the second sliding component comprises a second sliding plate,
    the first sliding plate and the second sliding plate are slidably arranged in the sliding groove, and
    the limiting component is configured to limit the first sliding plate of the first sliding component to the sliding groove.

12. The apparatus of claim 11, wherein:
the driving assembly further comprises two gaskets that are sleeved on two opposite ends of the rotating shaft, respectively.

13. The apparatus of claim 11, wherein:
the gear is fixedly connected to the toggle wheel;
a central hole extends through the toggle wheel and the gear; and
the rotating shaft fixedly penetrates through the central hole.

14. The apparatus of claim 11, wherein the housing comprises:
a front panel comprising:
  a mounting groove configured to mount the optical mechanism; and
  two windows spaced apart at a bottom surface of the mounting groove and penetrating through the front panel;
a top panel;
a bottom panel; and
two side panels spaced apart in parallel;
wherein:
  the front panel is connected to the top panel and the bottom panel; and
  the first lens barrel and the second lens barrel are mounted in the mounting groove.

15. The apparatus of claim 14, wherein the optical mechanism further comprises a fixing plate fixedly connected to the front panel and covering the mounting groove.

16. The apparatus of claim 15, wherein the optical mechanism further comprises:
two lenses each fixed to the front panel and covering a corresponding one of the two windows; and
two sealing rings each arranged between a corresponding one of the two lens and a corresponding one of the first lens barrel and the second lens barrel.

17. The apparatus of claim 15, wherein the optical mechanism further comprises:
two lenses each fixed to the front panel and covering a corresponding one of the two windows; and
a dustproof pad attached to the two lenses;
wherein:
  an outer edge of the dustproof pad is fixedly connected to the front panel; and
  the dustproof comprises two connecting holes are respectively formed at positions corresponding to the two lenses, such that each of the first lens barrel and the second lens barrel is connected to the dustproof pad through one of the two connecting holes.

18. The apparatus of claim 11, wherein:
the guiding assembly further comprises a first limiting groove and a second limiting groove, the first limiting groove and the second limiting groove being connected to a same side of the sliding groove;
the first sliding component further comprises a first connecting plate;
the second sliding component further comprises a second connecting plate;
the first connecting plate is connected to an end of the first sliding plate away from the driving assembly and is movably received in the first limiting groove; and
the second connecting plate is connected to an end of the second sliding plate away from the driving assembly and is movably received in the second limiting groove.

19. The apparatus of claim 18, wherein:
the first lens barrel comprises a first engaging slot at a side of the first lens barrel that faces toward the adjustment mechanism;
the second lens barrel comprises a second engaging slot at a side of the second lens barrel that faces toward the adjustment mechanism;
the first connecting plate comprises a first buckle at an end of the first connecting plate that is away from the first sliding plate, the first buckle being inserted in the first engaging slot; and
the second connecting plate comprises a second buckle at an end of the second connecting plate that is away from the second sliding plate, the second buckle being inserted in the second engaging slot.

* * * * *